(12) United States Patent
Kennedy et al.

(10) Patent No.: US 7,269,216 B2
(45) Date of Patent: Sep. 11, 2007

(54) BLIND MAGNITUDE EQUALIZER FOR SEGMENT SYNC-BASED TIMING RECOVERY OF RECEIVERS

(76) Inventors: Rodney A. Kennedy, 6 Sweetgum Place, Jerrabomberra, New South Wales (AU); Dino Miniutti, 10 Merfield Place, Giralang, Australian Capital Territory 2617 (AU); Xuemei Ouyang, 70 Corton Ave., Apt. 4C, Ossining, NY (US) 10562; Monisha Ghosh, 569 Millwood Rd., Chappaqua, NY (US) 10514

(*) Notice: Subject to any disclaimer, the term of this patent is extended or adjusted under 35 U.S.C. 154(b) by 547 days.

(21) Appl. No.: 10/139,196

(22) Filed: May 6, 2002

(65) Prior Publication Data
US 2002/0181576 A1 Dec. 5, 2002

Related U.S. Application Data

(60) Provisional application No. 60/297,497, filed on Jun. 12, 2001, provisional application No. 60/295,864, filed on Jun. 5, 2001.

(51) Int. Cl.
*H03H 7/30* (2006.01)
*H04L 27/06* (2006.01)

(52) U.S. Cl. ........................ 375/233; 375/326
(58) Field of Classification Search ............ 375/229, 375/232, 233, 346, 350, 326; 333/18, 28 R; 708/322, 323
See application file for complete search history.

(56) References Cited

U.S. PATENT DOCUMENTS

| 4,411,000 A | * | 10/1983 | Kustka ........................ 375/229 |
| 5,268,761 A | * | 12/1993 | White ......................... 348/678 |
| 5,892,632 A | | 4/1999 | Behrens et al. ............... 360/51 |
| 5,933,467 A | | 8/1999 | Schier et al. |
| 6,219,379 B1 | | 4/2001 | Ghosh |
| 6,370,191 B1 | * | 4/2002 | Mahant-Shetti et al. ..... 375/233 |
| 6,459,730 B1 | * | 10/2002 | Samueli et al. ............. 375/233 |
| 6,597,746 B1 | * | 7/2003 | Amrany et al. ............. 375/296 |
| 7,054,359 B2 | * | 5/2006 | Kennedy et al. ............ 375/232 |

OTHER PUBLICATIONS

"Blind Decision Feedback Equalization for Terrestrial Television Receivers" by Monisha Ghosh, proceedings of the IEEE vol. 86, No. 10 Oct. 1998.
International Search Report dated Oct. 24, 2002.

* cited by examiner

*Primary Examiner*—Young T. Tse
(74) *Attorney, Agent, or Firm*—Sofer & Haroun, LLP

(57) ABSTRACT

A magnitude only equalizer equalizes a magnitude of a received wireless signal without regard to phase distortions introduced, and transmits the magnitude equalized signal to a timing recovery loop for improved correlation peak detection in a sync based timing recovery scheme. A channel equalizer receiving the output signal from the timing recovery loop equalizes the signal and corrects any phase distortions introduced by the magnitude only equalizer. The magnitude only equalizer includes at least one filter utilizing only real coefficients and constrained such that the direct term of the overall filter structure within the magnitude only equalizer is unity.

14 Claims, 11 Drawing Sheets

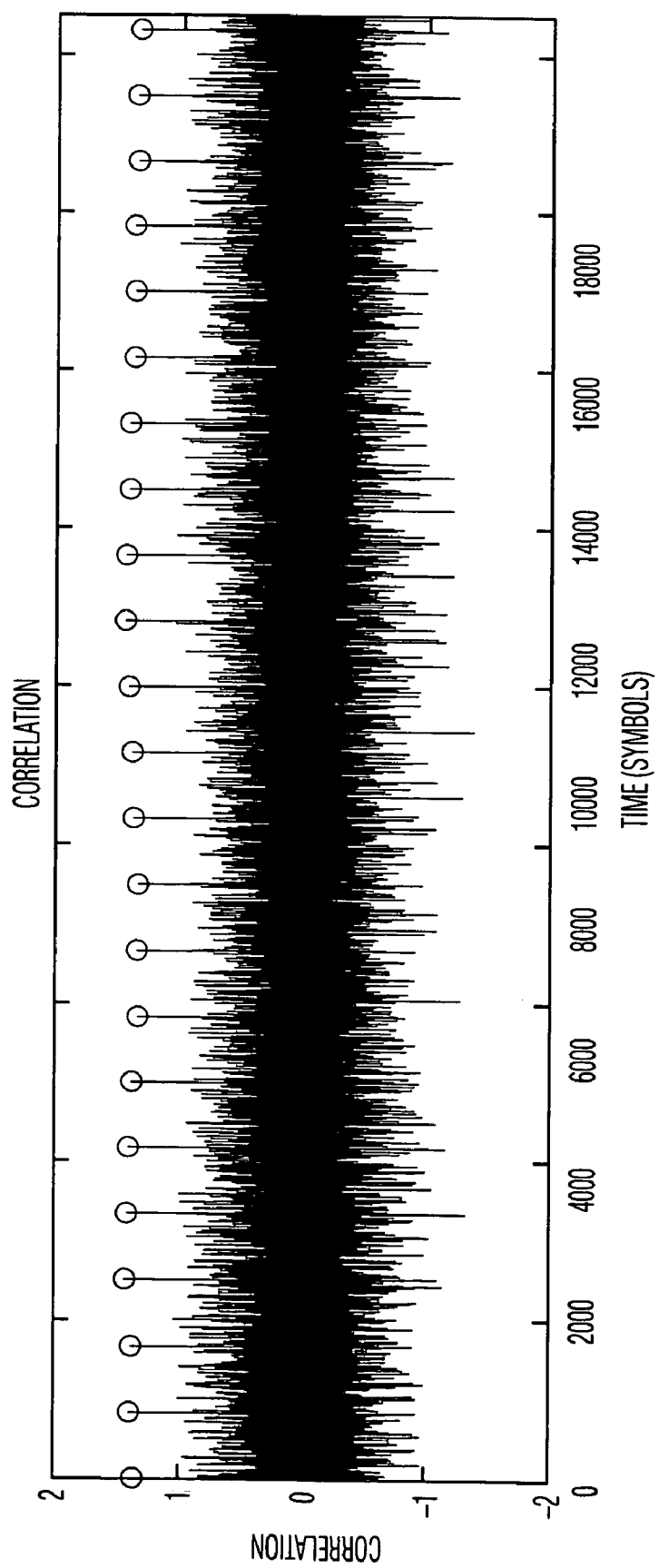
FIG. 3A1

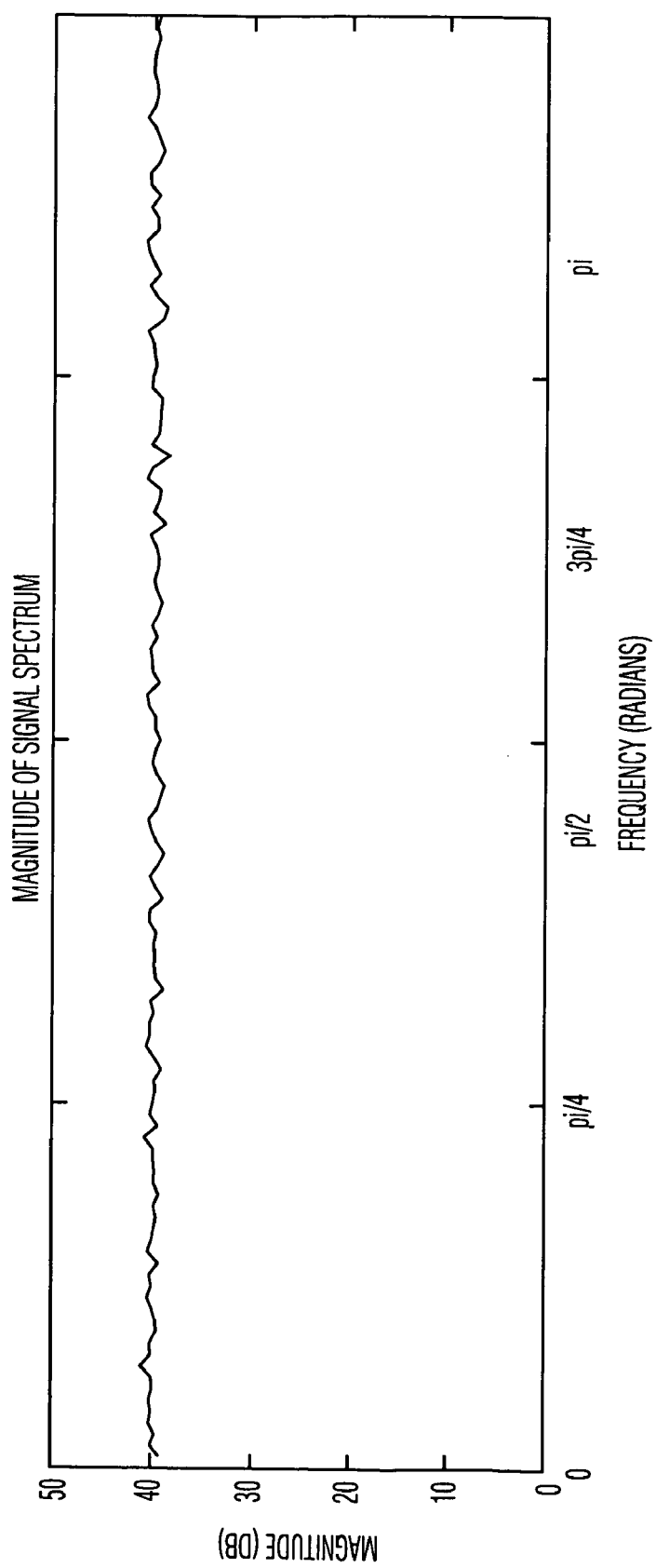
FIG. 3A2

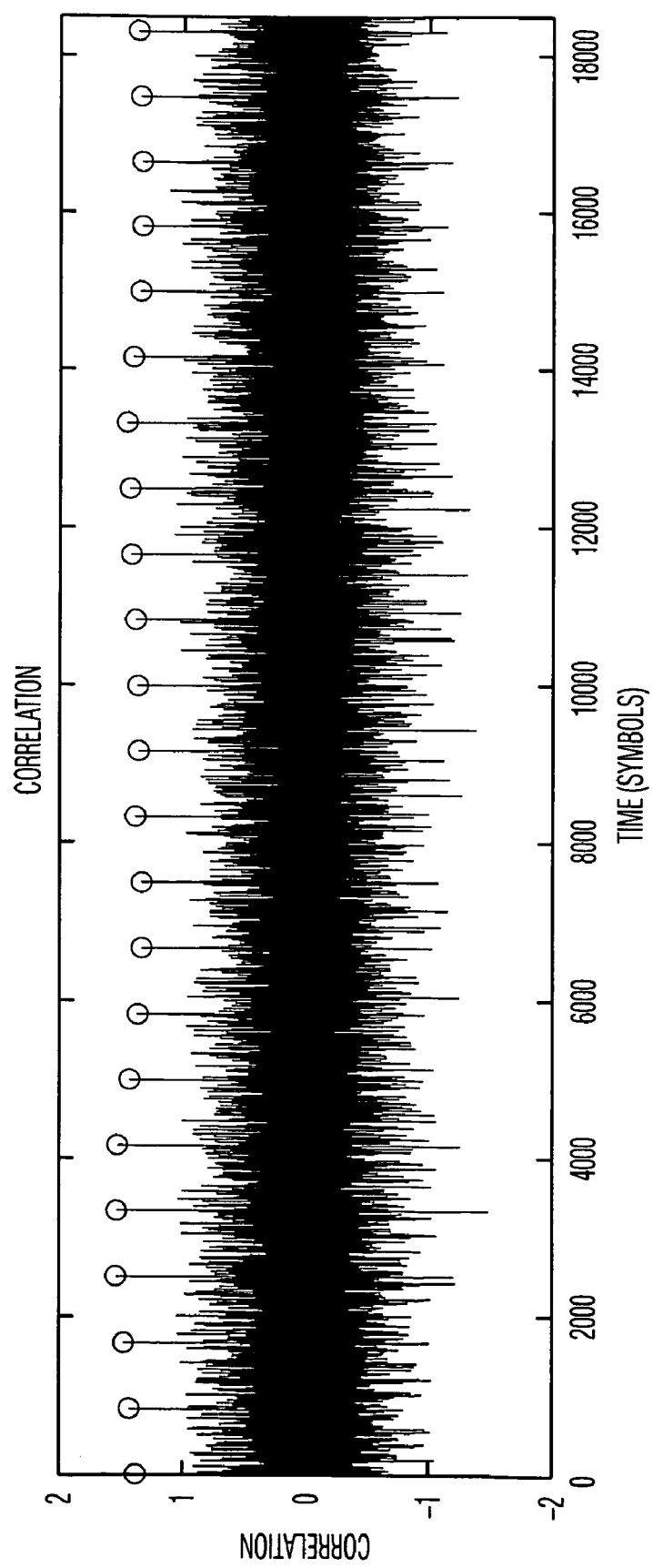
FIG. 3B1

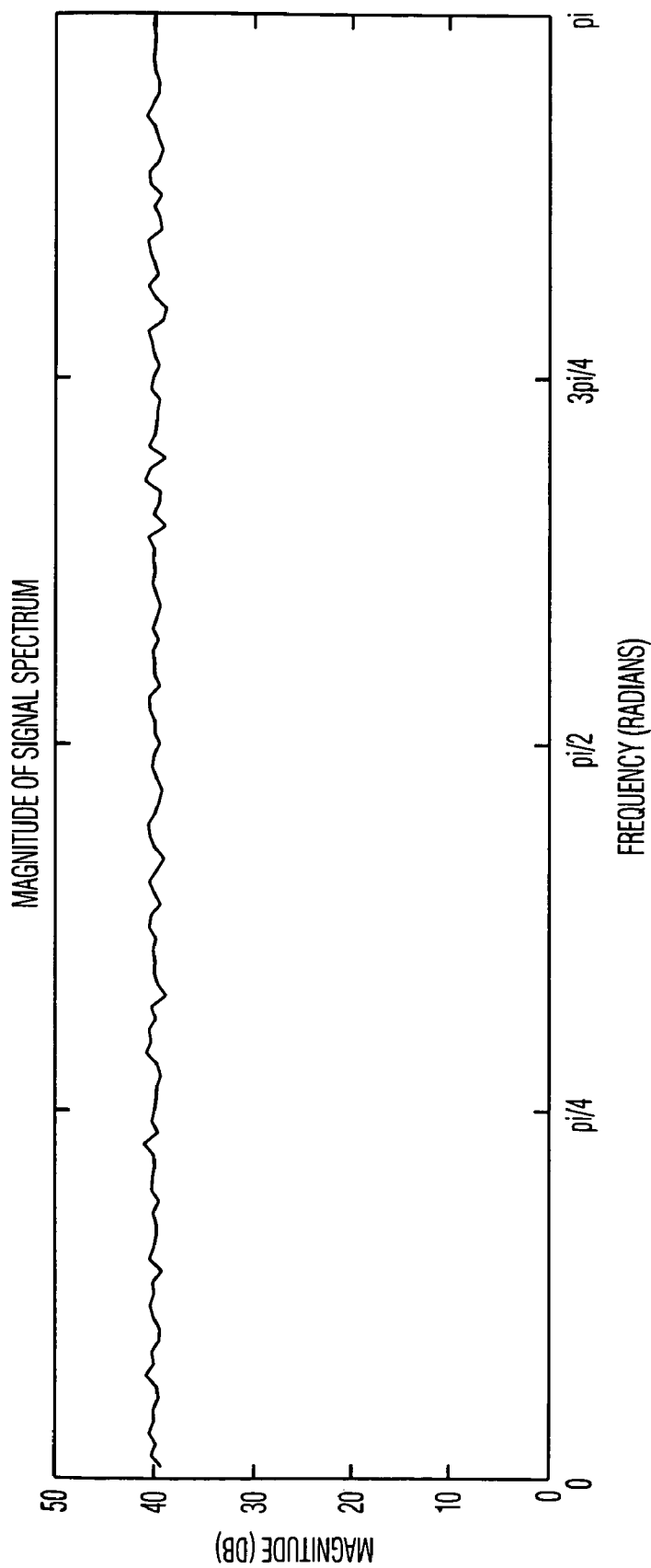
FIG. 3B2

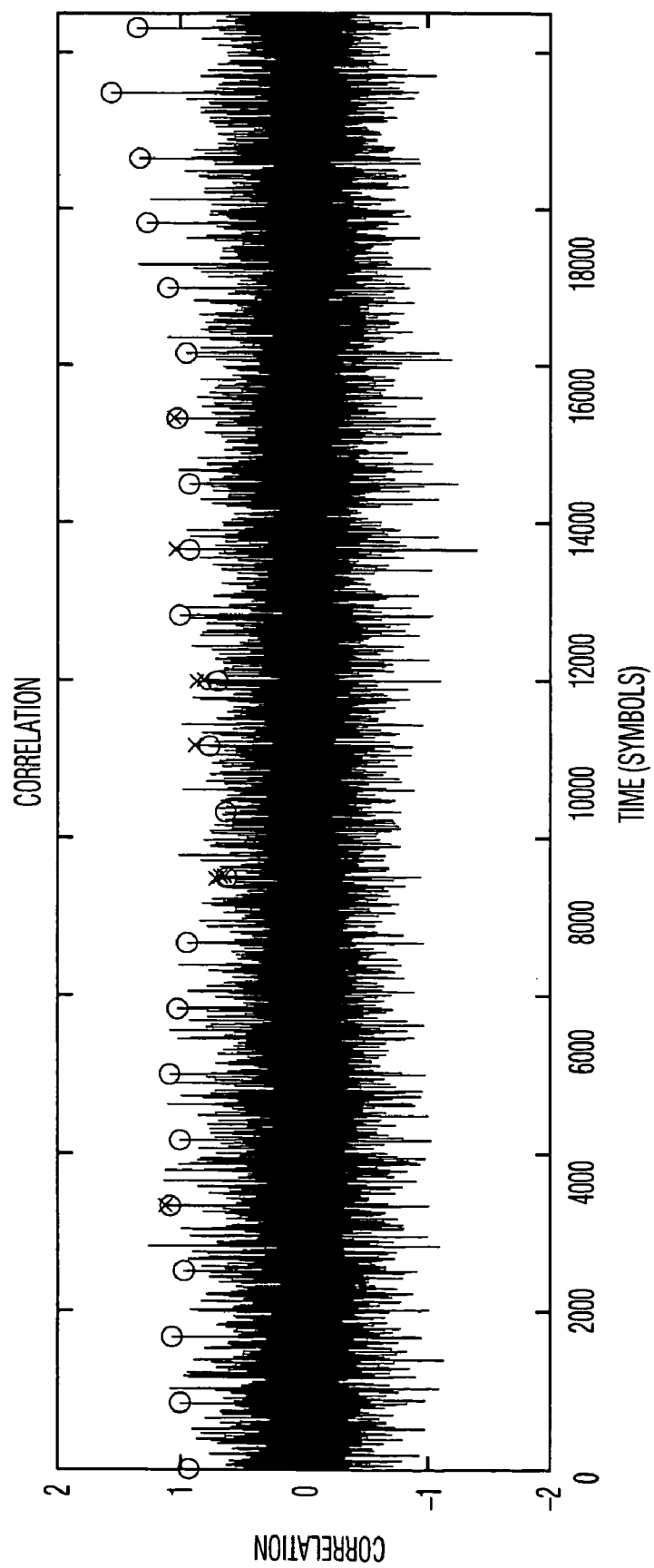
FIG. 4A1

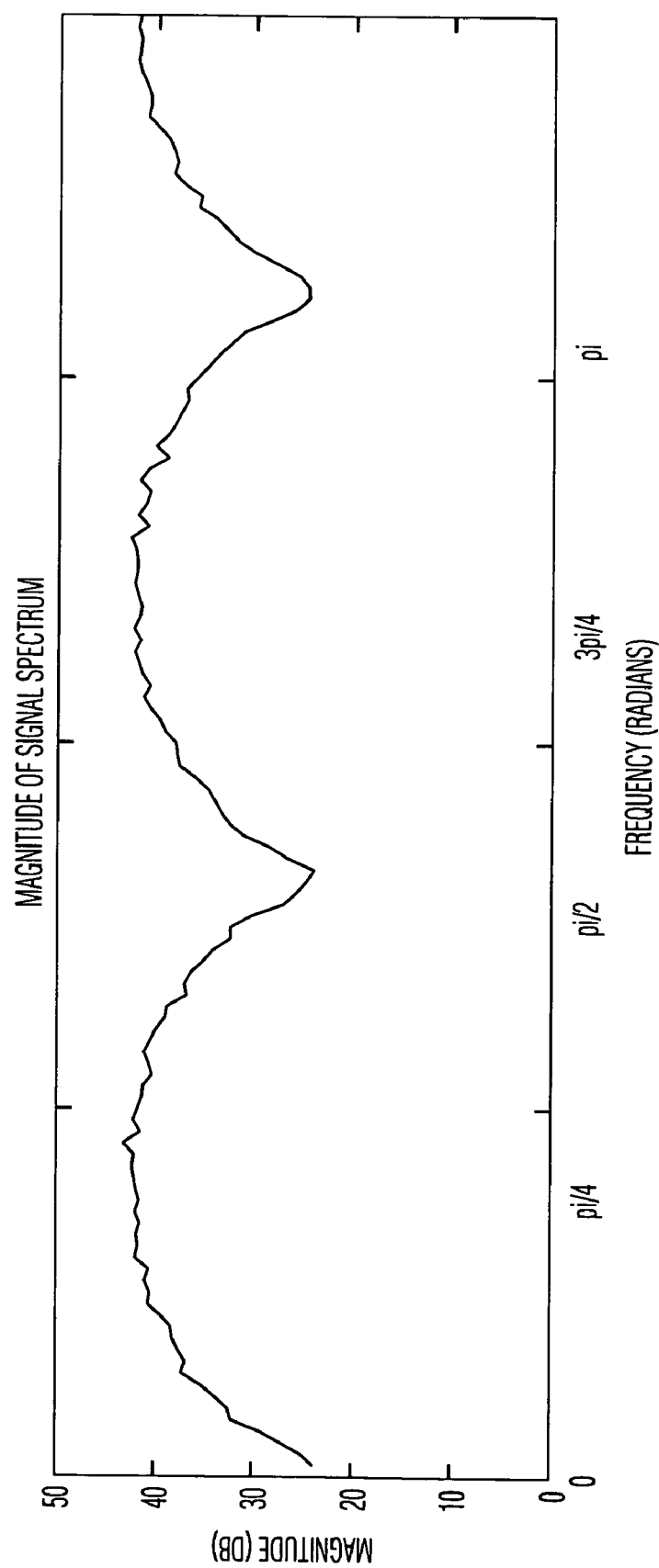
FIG. 4A2

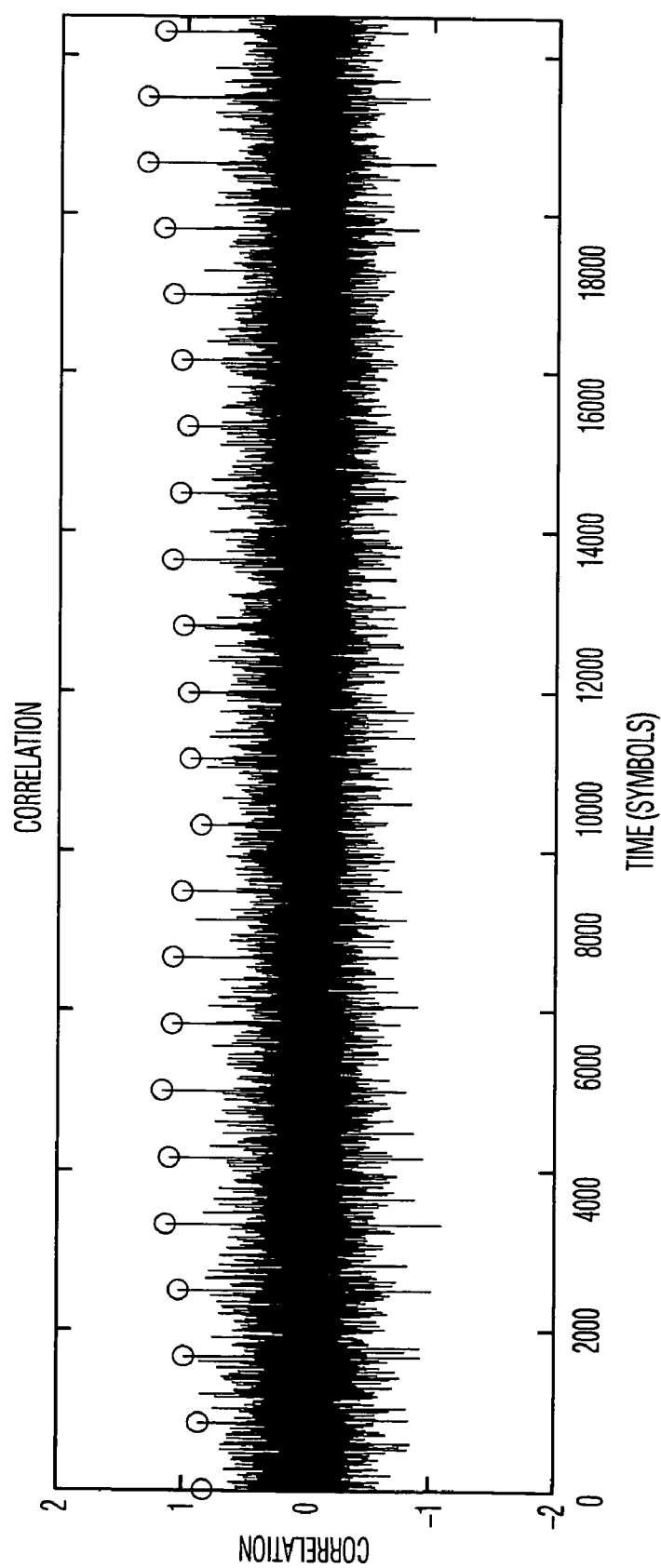
FIG. 4B1

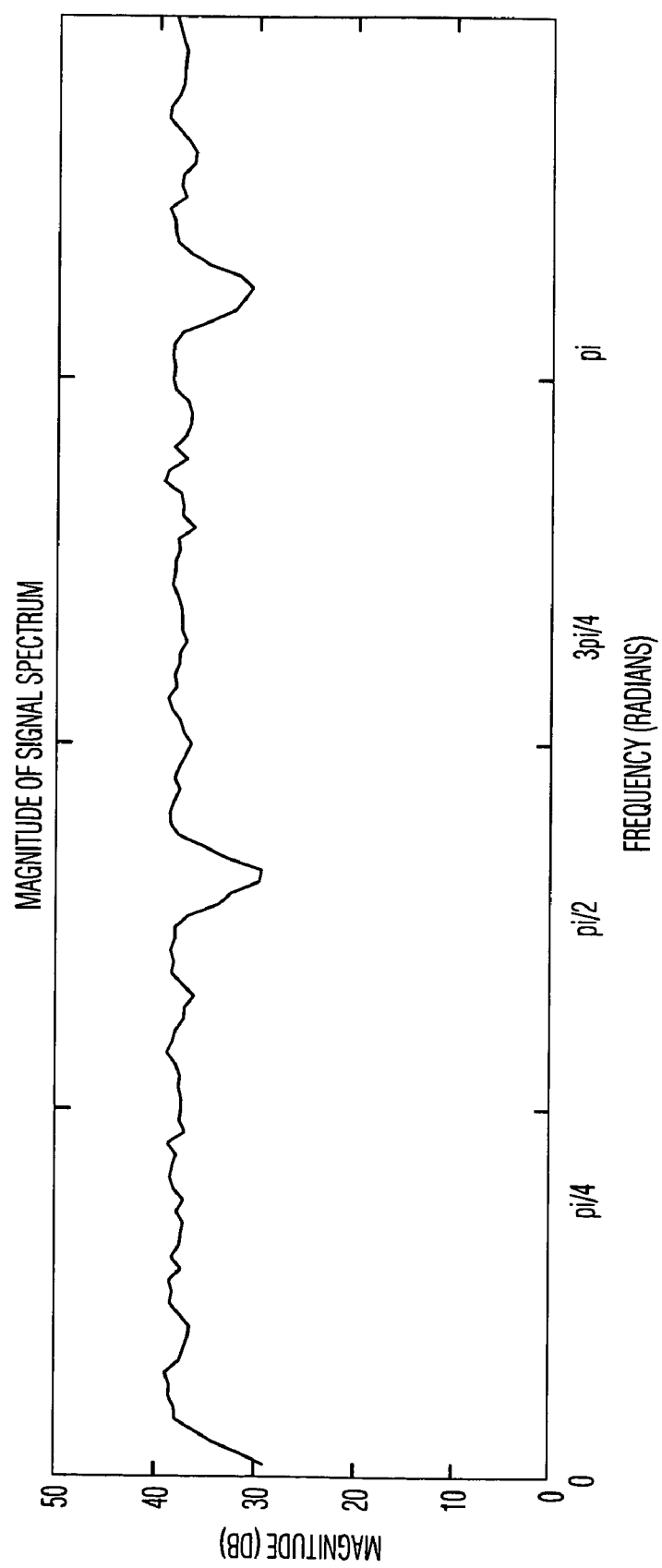
FIG. 4B2

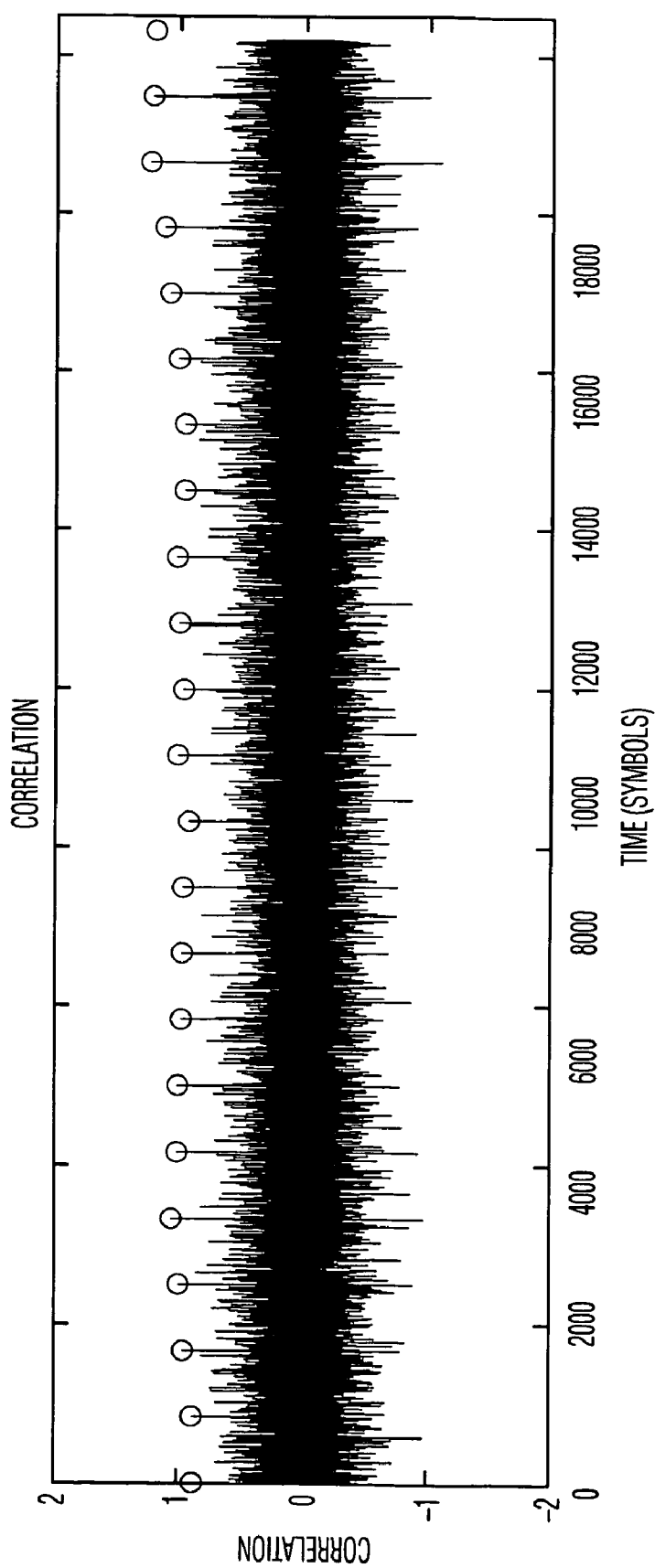
FIG. 4C1

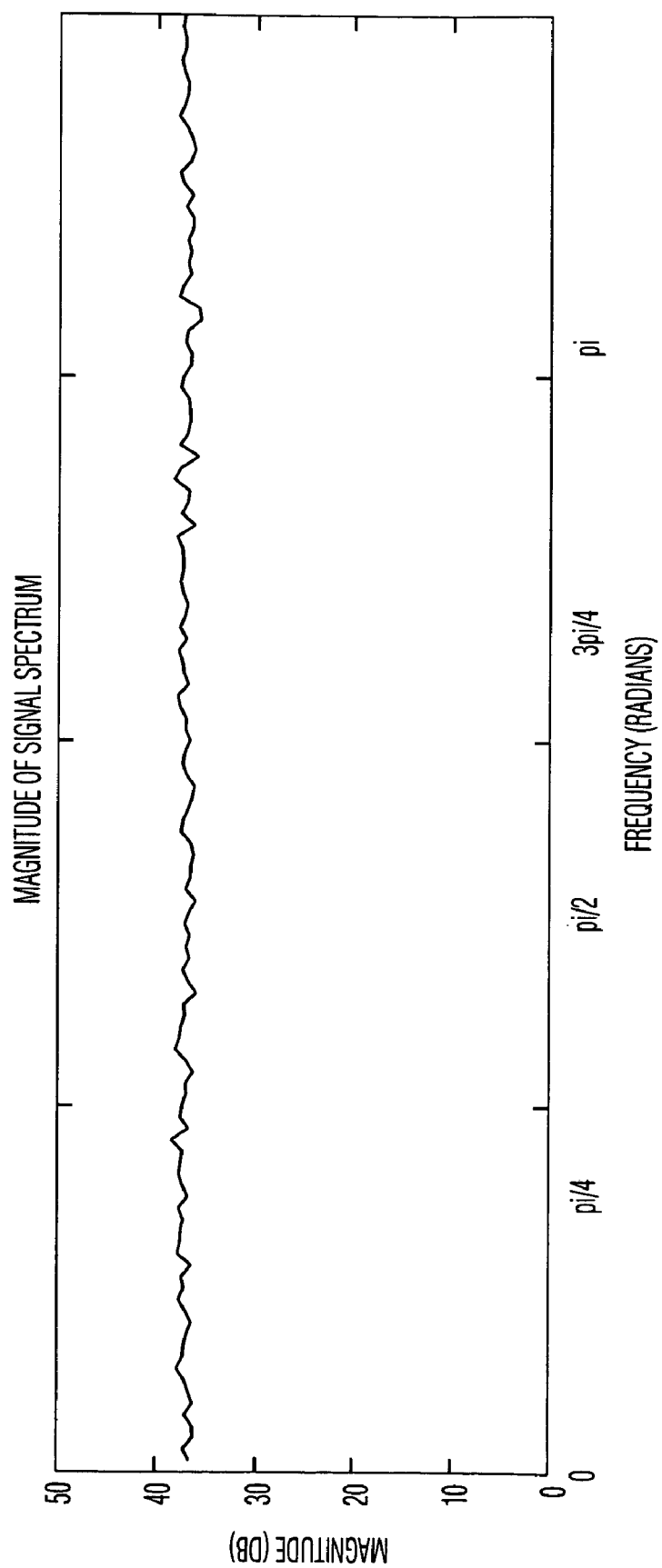
FIG. 4C2

BLIND MAGNITUDE EQUALIZER FOR SEGMENT SYNC-BASED TIMING RECOVERY OF RECEIVERS

CLAIM FOR PRIORITY/CROSS-REFERENCE TO RELATED APPLICATION(S)

This application claims priority to U.S. provisional applications Ser. Nos. 60/295,864 and 60/297,497 filed Jun. 5, 2001 and Jun. 12, 2001, respectively, is related to the subject matter disclosed in commonly assigned, copending U.S. patent application Ser. No. 10/139,173 entitled "VSB-MOE PRE-EQUALIZER FOR 8-VSB DTV" and filed on Dec. 12, 2002. The content of the above-identified application(s) is incorporated herein by reference.

TECHNICAL FIELD OF THE INVENTION

The present invention is directed, in general, to timing recovery for wireless receiver systems and, more specifically, to channel equalization to assist in sync based timing recovery for wireless receiver systems.

BACKGROUND OF THE INVENTION

Sync based timing recovery schemes generally assume no multipath characteristics for the received signal. When operating over a channel exhibiting long multipath profiles (significant temporal dispersion or significant delay spread), such timing recovery schemes can break down because correlation peaks may become indistinct (that is, either clear correlation peaks are not apparent or false peaks manifest). In effect, the long channel impulse response smears any underlying correlation peaks, making precise peak detection impossible.

Temporal dispersion in the received signal due to multipath interference is generally corrected by an equalizer in the receiver. A simplistic solution to the problem of multipath interference with correlation peaks would be to rectify the temporal dispersion utilizing an equalizer; however, a conventional receiver structure requires both carrier and timing recovery to be operative before equalization may be effectively employed.

The problem is thus circular in nature, with successful equalization requiring timing recovery to be operative and ideal sync based timing recovery for a multipath signal requiring equalization to be operative. In short, using a full equalizer to clean up the sync correlation peaks is neither advisable nor feasible.

There is, therefore, a need in the art for improvement of timing recovery despite multipath interference.

SUMMARY OF THE INVENTION

To address the above-discussed deficiencies of the prior art, it is a primary object of the present invention to provide, for use in a wireless receiver, a magnitude only equalizer which equalizes a magnitude of a received wireless signal without regard to phase distortions introduced, and transmits the magnitude equalized signal to a timing recovery loop for improved correlation peak detection in a sync based timing recovery scheme. A channel equalizer receiving the output signal from the timing recovery loop equalizes the signal and corrects any phase distortions introduced by the magnitude only equalizer. The magnitude only equalizer includes at least one filter utilizing only real coefficients and constrained such that the direct term of the overall filter structure within the magnitude only equalizer is unity.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth Be definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIGS. 3A1, 3A2, 3B1 and 3B2 are comparative simulations illustrating the absence of undesirable artifacts introduced by a minimum output energy magnitude only equalizer according to one embodiment of the present invention; and FIGS. 4A1, 4A2, 4B1, 4B2, 4C1 and 4C2 are comparative simulations illustrating the improvement of correlation peak detection as a result of utilizing a minimum output energy magnitude only equalizer according to various embodiments of the present invention.

DETAILED DESCRIPTION OF THE INVENTION

FIGS. 1 through 4C, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
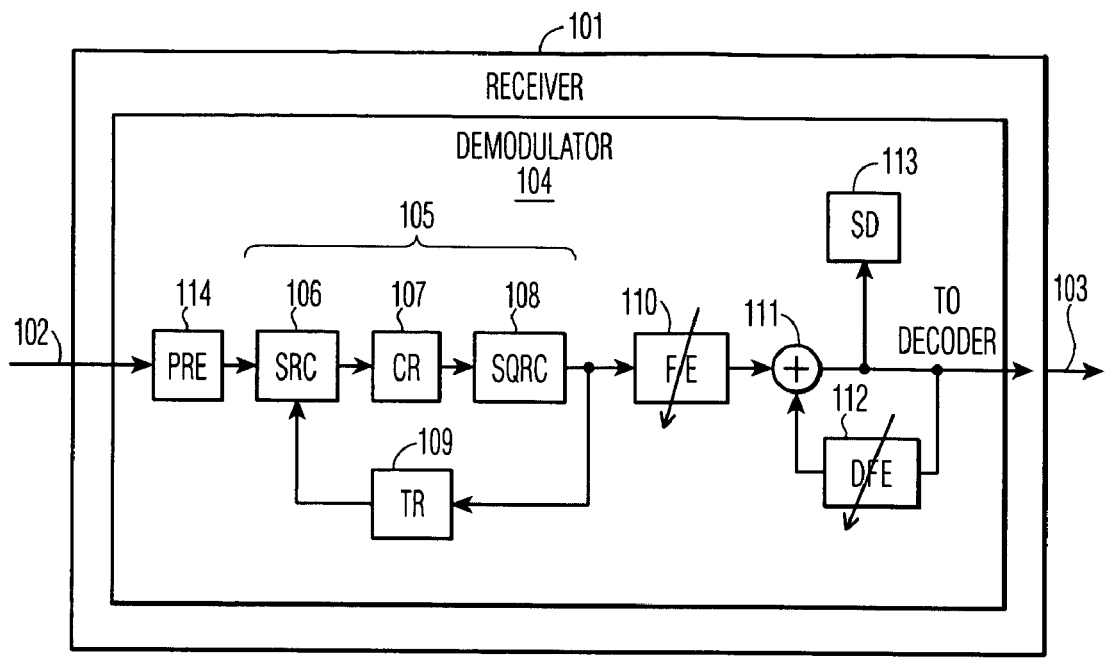
FIG. 1 depicts a wireless communications receiver system including a blind magnitude (second order) pre-equalizer for improved channel equalization according to one embodiment of the present invention.

FIG. 1 depicts a wireless communications receiver system including a blind magnitude (second order) pre-equalizer for improved channel equalization according to one embodiment of the present invention. Receiver system 100 includes a receiver 101, which is a digital television (DTV) receiver in the exemplary embodiment, including an input 102 for receiving wireless signals, optionally an output 103, and a demodulator 104.

In the example shown, receiver 101 is intended to receive and demodulate vestigial sideband (VSB) signals with eight discrete levels (8-VSB) according to current Advanced Television Systems Committee (ATSC) standards. However, receiver 101 may alternatively be any type of receiver for a communications system requiring communications channel equalization and employing sync based timing recovery. Receiver 101 may therefore be any audio and/or video communications receiver including a satellite, terrestrial or cable broadcast receiver and/or television, a video cassette recorder (VCR) or digital video recorder (DVR), or a digital versatile disk (DVD) player.

Those skilled in the art will recognize that the full details of the construction and operation for a complete wireless communications receiver are not depicted in the drawings or described herein. Instead, for simplicity and clarity, only so much of the construction and operation of a wireless communications system as is unique to the present invention or necessary for an understanding of the present invention is depicted and described.

Receiver 101 in the exemplary embodiment includes a timing recovery loop 105 having sequentially connected sample rate converter (SRC) unit 106, carrier recovery (CR) unit 107, and a square root raised cosine (SQRC) filter unit 108, with a timing recovery (TR) unit 109 within the feedback loop. A simple forward equalizer (FE) unit 110 may optionally be coupled in series between the timing recovery loop 105 and a signal adder 111 for equalization of the recovered signal based on decision feedback equalizer (DFE) unit 112, with a sync detector (SD) 113 optionally coupled to the equalized output signal from signal adder 111.

In the present invention, the received signal is passed through a pre-equalizer (Pre) unit 114 coupled between the input 102 and the timing recovery loop 105. It may be observed that sync-based correlation is a second order statistical method, such that full equalization of the channel is not necessary to clean up the correlation signal. Instead, only equalization of the channel in a second order sense is necessary to (at least in principle) gain the full benefits available. Thus, as a practical matter, equalizing the magnitude response of the channel is sufficient, and is also possible without relying on successful timing recovery. Therefore, pre-equalizer 114 employs a blind second order adaptive algorithm to correct the magnitude response, and one class of such algorithms is described in further detail below.

Figure 2A:
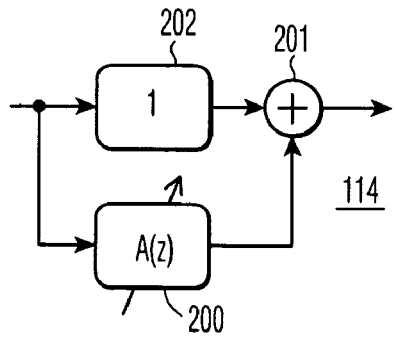
FIGS. 2A and 2B illustrate in further detail feed-forward and feedback, respectively, blind magnitude (second order) pre-equalizers according to various embodiments of the present invention.
Figure 2B:
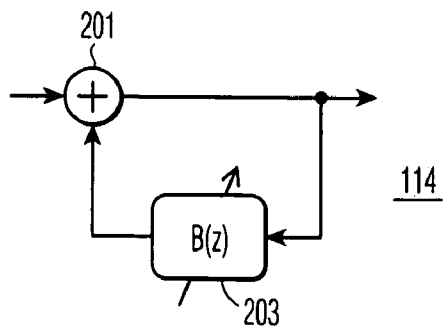

FIGS. 2A and 2B illustrate in further detail feed-forward and feedback, respectively, blind magnitude (second order) pre-equalizers according to various embodiments of the present invention. In both embodiments shown, the magnitude only equalizers 114 employed for pre-equalization corrects only for magnitude distortions and treats any phase distortion as irrelevant. The phase is not unaffected by the magnitude only equalizer 114, which may introduce phase distortions into the signal that generally may be (at least theoretically) characterized, depending upon the algorithm employed. Preferably, an adaptive minimum output energy (MOE) criterion is employed. Further general information regarding use of the adaptive minimum output energy criterion is provided in the related application.

In the present invention, the minimum output energy criterion is preferably employed with the direct filter response term being constrained to unity, either with the transversal structure of FIG. 2A by fixing the leading coefficient or with the recursive structure of FIG. 2B, which automatically has a direct term of unity in the closed loop.

In the embodiment of FIG. 2A, pre-equalizer 114 is a purely transversal realization in which the feedback parameter $B(z)$ is zero and the adaptive feed-forward parameter $A(z)$ introduced by filter component 200 at signal adder 201 is real, with unity gain by filter component 202. In the embodiment of FIG. 2B, however, pre-equalizer 114 is a purely recursive realization in which the feed-forward parameter $A(z)$ is zero and the adaptive feedback parameter $B(z)$ introduced by filter component 203 at signal adder 201 is real, automatically producing a unity direct term due to the closed loop.

In the preferred implementations having the direct filter response term constrained to unity, the minimum output energy criterion acts to equalize the minimum phase equivalent of the channel. That is, if the channel is at minimum phase, then the action of the minimum output energy pre-equalizer filter 114 is to fully equalize the channel. When the channel is mixed phase (non-minimum phase), the minimum output energy pre-equalizer filter 114 effectively converts the channel to an all-pass channel defined by the non-minimum phase zeros of the channel.

FIGS. 3A1, 3A2, 3B1 and 3B2 are comparative simulations illustrating the absence of undesirable artifacts introduced by a minimum output energy magnitude only equalizer according to one embodiment of the present invention. To be effective, the action of the minimum output energy magnitude only equalizer should be invariant when applied to an all-pass channel. Simulations using the channel:

$$H(z) = \frac{1 - 1.5z^{-1}}{1 - 0.6667z^{-1}}$$

were conducted with and without a minimum output energy magnitude only equalizer according to the embodiments of FIGS. 2A and 2B. FIGS. 3A1 and 3A2 illustrate the timing recovery correlation response and signal spectrum magnitude for an all-pass channel of a receiver without the minimum output energy magnitude only equalizer, while FIGS. 3B1 and 3B2 illustrate the timing recovery correlation response and signal spectrum magnitude for an all-pass channel of a receiver with the minimum output energy magnitude only equalizer. The timing recovery correlation response and signal spectrum magnitude are substantially identical for both cases, corroborating that the minimum output energy magnitude only equalizer is invariant to all-pass factors.

FIGS. 4A1 through 4C2 are comparative simulations illustrating the improvement of correlation peak detection as a result of utilizing a minimum output energy magnitude only equalizer according to various embodiments of the present invention. The simulations were performed to evaluate performance of the timing recovery system of the present invention with an input consisting of an 8-level binary signal that includes four synchronization (SYNC) bits [5, −5, −5, 5] every 832 signals. The generated data was passed through a real channel with additive white gaussian noise (AWGN) producing a signal-to-noise ratio (SNR) of less than 20 decibels (dB). The channel used for the simulations was a zero dB echo channel with $$H(z)=1-z^{-5}$$

with an equivalent impulse response h=[1,0,0,0,0,−1]. This channel is known to be a problem for bandedge timing recovery schemes since the frequency response has a null on one bandedge, and the channel also exhibits a number of nulls throughout the frequency band. The signal at the receiver was passed through a minimum output energy magnitude only equalizer filter, then correlated against the SYNC sequence to find the location of those SYNCs in the original data. Simulations were performed using both the feed-forward and feedback structures depicted in FIGS. 2A and 2B, and correlation was also performed on an unfiltered version of the received data for comparison.

FIGS. 4A1 and 4A2 illustrate simulation correlation and magnitude of signal spectrum results for data passed through a 0 dB echo channel and received at the receiver without a minimum output energy magnitude only equalizer (that is, without any magnitude compensation). The circles in the correlation plot show where the correlation peaks should be located, while the crosses indicate where correlation peaks were found within a prescribed sample radius (15 in the example shown) of the expected peak and having a magnitude greater than the peak at the expected position (i.e., "false" correlation peaks). The crosses thus indicate areas where the timing recovery scheme could have problems in finding the correct peaks, with the channel distortions obscuring clear correlation peaks.

FIGS. 4B1 through 4C2 illustrate simulation correlation and magnitude of signal spectrum results for data passed through the 0 dB echo channel and filtered using the feed-forward and feedback minimum output energy magnitude only pre-equalizer structures of FIGS. 2A and 2B, respectively. Notably, the correlation peaks are more distinct and the presence of potential false peaks (denoted by crosses) is diminished.

The present invention enhances timing recovery to overcome problems due to channel temporal (multipath) distortions on sync correlation based timing recovery schemes, particularly as applied to 8-VSB digital television (DTV) transmissions. A magnitude only equalizer, adapted in a blind fashion using a second-order statistical cost function, may be incorporated into the timing recovery stage of a receiver and operate largely independently of the timing recovery operation. Sync correlation based timing recovery schemes may therefore work in situations for which they were not designed (i.e., multipath interference). Furthermore, due to the adaptation speed of the blind adaptive magnitude equalizer, the timing recovery system can converge relatively rapidly, and thereby have the capability of tracking time varying multipath interference.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A portion of a receiver comprising:
   a timing recovery mechanism; and
   a magnitude equalizer coupled between an input for receiving a wireless signal and the timing recovery mechanism, the magnitude equalizer equalizing a magnitude of the received signal and transmitting a magnitude equalized signal to the timing recovery mechanism, wherein said magnitude equalizer includes a signal adder and either one of
   a feed-forward filter coupled between the input and a first input of the signal adder and a unity gain filter coupled between the input and a second input of the signal adder in parallel with the feed-forward filter; or
   a feedback filter coupled within a feedback loop between an output of the signal adder and a first input of the signal adder, wherein the input is a second input of the signal adder.

2. The portion of a receiver according to claim 1, wherein the magnitude equalizer equalizes the magnitude of the received signal without regard to phase distortions introduced.

3. The portion of a receiver according to claim 1, further comprising:
   a channel equalizer coupled to an output of the timing recovery mechanism, the channel equalizer equalizing a signal from the timing recovery mechanism.

4. The portion of a receiver according to claim 3, wherein the channel equalizer corrects any phase distortions introduced by the magnitude equalizer.

5. The portion of a receiver according to claim 1, wherein within said magnitude equalizer: either one of said feed forward filter or said feedback filter utilizes only real coefficients and constrained so that a direct term of the overall filter structure within the magnitude equalizer is unity.

6. A receiver comprising:
   an input for receiving a signal;
   a timing recovery mechanism;
   a channel equalizer coupled to an output of the timing recovery mechanism, the channel equalizer equalizing a signal received from the timing recovery mechanism; and
   a magnitude equalizer coupled between the input and the timing recovery mechanism, the magnitude equalizer equalizing a magnitude of the received signal and transmitting a magnitude equalized signal to the timing recovery mechanism, wherein said magnitude equalizer includes a signal adder and either one of a feed-forward filter coupled between the input and a first input of the signal adder and a unity gain filter coupled between the input and a second input of the signal adder in parallel with the feed-forward filter; or a feedback filter coupled within a feedback loop between an output of the signal adder and a first input of the signal adder, wherein the input is a second input of the signal adder.

7. The receiver according to claim 6, wherein the magnitude equalizer equalizes the magnitude of the received signal without regard to phase distortion introduced.

8. The receiver according to claim 6, further comprising:
a sync detector coupled to an output of the channel equalizer.

9. The receiver according to claim 6, wherein the channel equalizer corrects any phase distortions introduced by the magnitude equalizer.

10. The receiver according to claim 6, wherein within the magnitude equalizer: either one of said feed forward filter or said feedback filter utilizes only real coefficients and constrained so that a direct term of the overall filters structure within the magnitude equalizer is unity.

11. A method of improving correlation peak detection in a sync based timing recovery scheme within a receiver comprising:
receiving a signal;
equalizing a magnitude of the received signal; and
transmitting a magnitude equalized signal to a timing recovery mechanism, wherein said magnitude equalized signal is processed through either one of a feed-forward filter coupled between an input and a first input of a signal adder with a unity gain filter coupled between the input and a second input of the signal adder in parallel with the feed-forward filter; or a feedback filter coupled within a feedback loop between an output of the signal adder and a first input of the signal adder, wherein the input is a second input of the signal adder.

12. The method according to claim 11, wherein the step of equalizing the magnitude of the received signal further comprises:
equalizing the magnitude of the received signal without regard to phase distortion introduced.

13. The method according to claim 11, comprising:
equalizing a signal from the timing recovery mechanism.

14. The method according to claim 13, wherein the step of equalizing the signal from the timing recovery mechanism further comprises:
correcting any phase distortions introduced by equalizing the magnitude of the received signal prior to transmitting the equalized magnitude signal to the timing recovery mechanism.

* * * * *